April 21, 1942.  E. D. VAN TASSEL, JR  2,280,108
SOLE AND METHOD OF MAKING
Filed Oct. 10, 1939
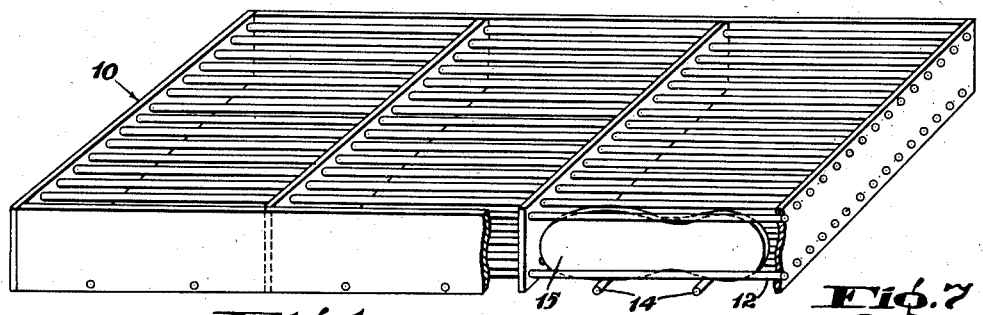
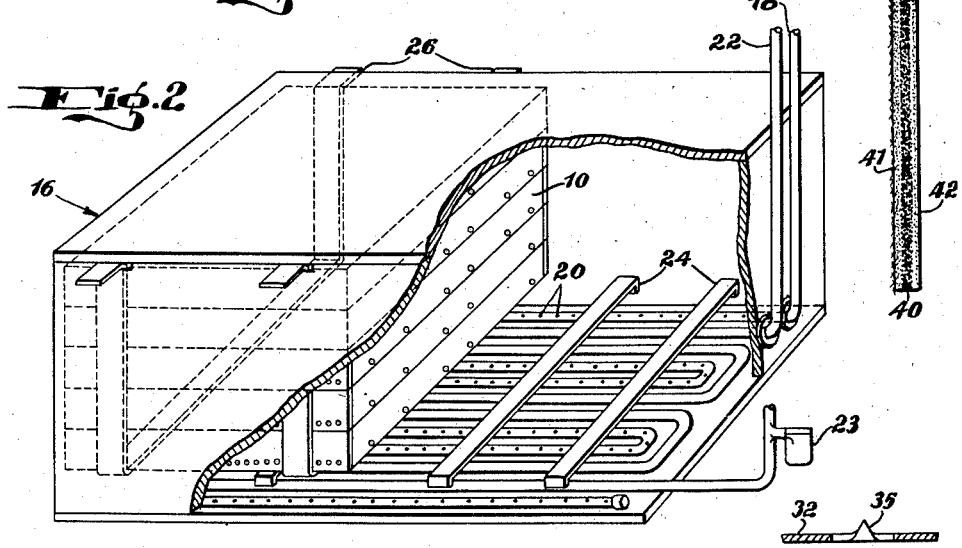
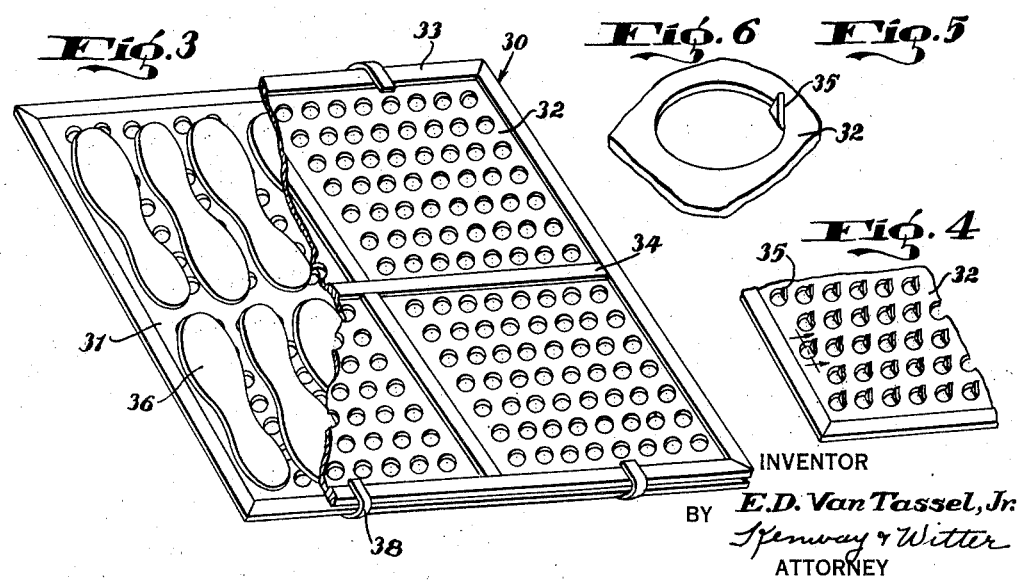
INVENTOR
E. D. Van Tassel, Jr.
BY Kenway & Witter
ATTORNEY Patented Apr. 21, 1942

2,280,108

UNITED STATES PATENT OFFICE 2,280,108

SOLE AND METHOD OF MAKING

Edward Deming Van Tassel, Jr., Newtonville, Mass., assignor, by direct and mesne assignments, to Abraham S. Guterman, Brookline, Mass., as trustee Application October 10, 1939, Serial No. 298,773

15 Claims. (Cl. 149—5)

This invention relates to a novel method of making insoles and outsoles for shoes whereby to produce a superior product economically and this application is a continuation in part of my copending application Ser. No. 171,714, filed October 29, 1937. Most such soles today are cut from vegetable tanned leather, which still retains much of its old time popularity because of the firmness of such stock which prevents distortion of the insole or outsole and eliminates the tendency to stretch and squash out from the sides of the shoes producing the well-known and undesirable edge-roll of the chrome retanned outsoles. It is well known that chrome tanned outsoles, with or without a certain amount of vegetable retanning, will give the wearer from 75% to 25% more wear than the vegetable tanned sole, but due to the open nature of the stock so tanned and its high percent of voids, it has been necessary to impregnate such stock with materials like molten wax in order to give some rigidity to the outsole, decrease edge-roll and to render the product waterproof. While the increase in wear of the chrome retan over the vegetable is somewhat reduced when the amount of vegetable retanning is increased, a much more desirable product is produced from the standpoint of reasonable firmness and lack of edge-roll if a full retannage with vegetable tan is given the chromed stock. However, most tanners have preferred to retan only part way through the hide and to use only a small amount of vegetable retan—from 2% to possibly 20% on the weight of the stock—after the full chrome tanning, because of the greatly increased cost of employing a full vegetable tan together with a full chrome tan, and have satisfied their customers with the complete impregnation of this open product with molten wax as mentioned above and with the story of the somewhat increased wear.

In the case of insoles the story is a little different, here the need of the chrome tanned stock reasonably filled throughout with vegetable tan is only beginning to be recognized. Almost all insoles today are cut from vegetable tanned stock, because it is the old accepted method and because insoles are generally cut from thinner stock than outsoles and, although the insole should be flexible and resilient, the greater firmness of the vegetable tanned stock and the thicker tanned product obtained from the thinner parts of the hide when tanned with vegetable, have kept the cost of the insole material at a relatively low level. For example in men's shoes retailing today for $5.00 the pair of vegetable tanned insoles might cost 15 cents, and the outsole 35 cents, whereas a preferred chrome-vegetable tanned insole, such as is discussed below and made by conventional methods, would cost from 22 cents to 30 cents, and the fully vegetable tanned and also fully chrome tanned outsole that I propose to make is not available on the market except from one or two very limited sources, and the price is much higher than the regular vegetable tanned outsole. Of course chromed and lightly retanned outsoles, impregnated with wax are available at about the price, or slightly higher than the vegetable tanned outsole.

The insole when chrome tanned has certain outstanding advantages over the regular vegetable tanned product—it does not become cracky and of uneven surface after a period of wearing, which is the chief fault of the vegetable tanned stock, because the chrome tanned stock is resistant to the moisture and acids of the perspiration, and it can be much more flexible and resilient than vegetable tanned stock and yet maintain its shape and the shape of the shoe provided the vegetable tan is also present throughout the full thickness of the stock. It is well known that the life, and therefore in part the value, of a shoe depends on the life and quality of the insole—even in high grade shoes the vegetable tanned insole warps and cracks and causes the shoe to be discarded long before the rest of the shoe (exclusive of the outsole which can be readily replaced) has deteriorated. When a chrome retanned insole is used this part of the shoe remains in satisfactory condition until the rest of the shoe is entirely worn out, and without developing humps and hollows and cracks.

It is understood that insoles and outsoles of the type discussed above can be cut from hides tanned first with chrome and then with vegetable or vice versa or from hides tanned with a combination tan—that is, both chrome and vegetable simultaneously. However these methods—involving tanning the entire hide, or the whole of certain parts cut from the hide, such as shoulders for example—are costly in that a full amount of both chrome and vegetable tan together with the necessary labor and overhead must be charged to all parts of the hide, it being well understood that many parts of the hide will be so poor in quality that they will not sell at a price equal to the cost of tanning, and other parts will always be so low in quality that any additional cost added to their treatment will not be economical.

It is the purpose of my invention to produce these desirable insoles and outsoles at a low cost—only slightly above the cost of the standard vegetable tanned product, and I accomplish this by employing as a starting point soles and insoles already cut from vegetable tanned stock (which is always obtainable in large volume and at competitive prices), and of the desired selection, and without the presence of the undesirable portions of the hide, and by limiting the additional cost of chrome tanning to those portions, or rather those sole pieces, which can bear this additional cost, and which can be sold at a profit following such treatment.

Since in the case of sole pieces cut from finished vegetable tanned leather a certain amount of rolling and setting out of the stock has already been accomplished, and since these sole pieces when so cut will tend to lie reasonably flat and in a plane, it is important that the flatness and the particular shape and size of the pieces be retained during the subsequent chrome tanning and other treating operations, otherwise much of the value and character already present in the vegetable tanned sole pieces will be lost. Therefore, more specifically my invention is concerned with chrome tanning and otherwise treating such sole pieces of finished vegetable tanned stock, and also from certain grades of rough vegetable tanned stock, so that they will not warp or curl during the treatments, and so that the size and configuration of the pieces will not be appreciably changed. In the case of the more lightly vegetable tanned stock I have found it desirable to hold the pieces firmly between perforated plates, as described in detail below, so that shrinkage is avoided, whereas in the case of the firmer more fully vegetable tanned stock, I have found that these carefully controlled treatments may be applied, without warping or curling of the stock, if the sole pieces are loosely held in a plane by means of racks, where the freedom of movement is slight, and under conditions so that the several treating solutions may have ready access to all surfaces of the sole pieces during treatment, the sole pieces being in spaced relation to each other, and in no case in contact with each other (thus avoiding "kiss-marks"), and in no case being tumbled around by a drumming or other agitation operation, the solutions if desired being gently agitated around and between the sole pieces by bubbling air up through the solutions, for example.

A further feature of my invention concerns the nesting of these racks or of the frames of perforated metal, so that a series of the racks or a series of the frames can be moved about as a unit, from one treating solution to the next, and in some cases directly into the drier.

A still further feature of my invention concerns the type treatments before and during and after the actual chrome tanning operation, since the chrome tanning of fully vegetable tanned leather requires certain changes in the method normally used when drumming untanned stock in a chrome tan solution. In order to avoid shrinkage and possible curling during the drying of the treated sole pieces the stock should be fully chrome tanned so that a piece cut from the chrome tanned sole piece will show no shrinkage or curling when immersed in boiling water for one minute. In order to accomplish this complete chrome tanning of relatively thick insole and outsole stock, that is already firm and well filled from the full vegetable tannage, and without drumming and by a still tannage, a relatively strong chrome tan solution is required and in large quantity to avoid rapid depletion of the solution, and a somewhat elevated temperature, and these operations should preferably be preceded by a stripping treatment to remove some of the vegetable tans from the surface layers of the stock. This latter treatment is optional for outsoles, but for insoles, besides increasing the rate of the chrome tanning, it is desirable to increase the flexibility of the insole without loosing too much of its firmness, and in both cases it greatly lessens the tendency of the fully rechromed fully vegetable tanned stock to crack on the grain when flexed sharply in the dry state. Actually the resulting product differs in an important manner from the chrome retanned sole leather of commerce, and also from certain combination tanned sole leathers—chrome and vegetable tan applied simultaneously. The chrome retanned stock always has the greatest concentration of the vegetable tan on the surfaces of the leather, and the center of the stock sometimes contains a little vegetable tan but generally contains none, and shows the characteristic green streak. The combination tan generally has the same concentration of vegetable all the way through. In my new product the vegetable tan in the center of the stock has been substantially undisturbed by my stripping treatment and remains at approximately as high a level as when the hide was removed from the tan yard—practically fully tanned and filled with the vegetable extracts. The surface layers of my treated sole pieces, however, contain a lower concentration of vegetable tan then the center of the stock, and thereby not only are different from prior art chrome retained and combination tanned stocks, but superior, since the tendency to crack is greatly reduced. The sole pieces are flexible because of this treatment, but the stock is still reasonably firm and the outsoles and the insoles do not permit undue distortion of the shoe in use, due to the fact that the center of the stock contains the very high percentage of combined and uncombined vegetable tanning materials, which act as a reinforcing rib against distortion. Because the outside layers of my improved insole and outsole have been somewhat depleted of the large amount of vegetable tannins and non-tannins, and since these outside layers are the ones that must be reasonably elastic if the sole piece is to be readily flexible, it is apparent that the desirable characteristic of flexibility is assured. However the firmer center layer—the reinforcing layer—is adequate to prevent warping and distortion during use, and in the case of outsoles the tendency to edge roll is eliminated by the reinforcing layer.

Here follows my preferred treatment for vegetable tanned outsoles and insoles after the sole pieces have been assembled in racks or in frames and a group of either the racks or the frames clamped together so as to be handled as a unit.

(1) Immerse the unit in a pit containing about ¼% borax solution, for 30 minutes at a temperature of 110° F. Drain-rinsing is optional and not necessary.

(2) Immerse in ¼% oxalic acid solution—30 minutes—110° F.

(3) Immerse in pit of chrome tan solution containing around two pounds of tanolin R per gallon (or an equivalent chrome tan solution) for a period of hours, until a piece cut from one of the pieces will stand the one minute boil test. With 4½ iron insoles at 110° F. about five hours are required. With heavy outsole stock about 48 hours will be necessary. I have used temperatures on insoles as high as 130° F. but with thicker and firmer stock it is advisable to start at around 110° F., and when tanning is about half done the temperature can be gradually raised to the 130° F.

(4) Immerse in a solution that will raise the pH of the sole piece containing the relatively acid chrome tan solution, to precipitate the chrome and to set the tan—and also to rinse off the excess chrome solution present. This bath can be at elevated temperature, 130° F. for example, and one hour's immersion is recommended. The bath can be warm water, since dilution causes hydrolysis and a precipitation of some of the chrome, or preferably this bath may contain a dilute solution of chrome tan which has been partly neutralized with alkali so that much of the chrome has been precipitated as hydroxide, and the pH of such a bath can vary between 4.5 and 6.0, and due to its buffer action will tend to remain fairly constant as long as some chrome hydrate remains in suspension. Since the precipitated chrome tends to accumulate it can be removed, redissolved and added to the chrome tan bath, from time to time.

(5) Immerse in warm water to rinse off any chrome deposits adhering to the stock.

(6) Immerse in a fat liquor solution. The time, concentration and temperature can be varied to give the desired effect. For many insoles I have found that one gallon of sulfonated neat's-foot oil (or cod oil) in twenty gallons of water, at around 125° F., for a period of one hour, produces a satisfactory product. Outsoles would normally receive a much lighter treat with the fat liquor since water-proofing is made more difficult when much sulfonated oil is present. I have used with success an oiling off operation on the grain, in place of fat liquor for outsoles.

(7) Dry at a low temperature, either in the frames, or after removing from the treating racks the soles can be supported on two rows of wooden pins sticking out from the face of a board which can be hung up in the drier. Temperatures higher than 120° F. are likely to cause shrinkage and excellent results are obtained by hanging the stock on pins in a loft or other factory space without applying any heat.

With the above and other objects in view, as will hereinafter appear, I shall now proceed to describe the invention more specifically and by reference to the accompanying drawing wherein is illustrated certain apparatus which may be used in carrying out the invention, and wherein Fig. 1 is a perspective view, partly broken away, of a frame adapted to support a plurality of sole pieces during treatment in accordance with my invention, Fig. 2 is a perspective view, partially broken away, of a treating tank for receiving and holding the trays during treatment of the sole pieces therein, Fig. 3 is a perspective view of a pair of frames supporting a plurality of sole pieces therebetween, a portion of the top frame being illustrated as broken away, Fig. 4 is a fragmentary perspective view of the top frame in inverted position, Fig. 5 is an enlarged sectional view taken on the sectional line indicated in Fig. 4, Fig. 6 is an enlarged perspective view thereof.

Fig. 7 is a cross sectional view of a piece of leather tanned in accordance with the method herein disclosed.

I shall now proceed to describe my invention in accordance with the specific steps and features which I preferably employ, it being understood that the scope of the invention is determined by the claims appended hereto. Instead of cutting sole pieces from the completed leather, such as leather which has been chrome tanned, and then vegetable tanned, I propose to select and cut the sole pieces from vegetable-tanned leather, such as vegetable tanned leather in the form of sides, backs, shoulders and bellies. In accordance with my invention I then proceed to give to these sole pieces the specific treatment necessary to produce soles or insoles having the characteristics desired, it being clear that such treatment can be more accurately and more economically carried out and produce a superior product than can the process heretofore used wherein the leather is completed before selecting and cutting out the soles.

A variety of methods may be used for supporting the sole pieces in spaced relation to each other, so that only a limited amount of movement and flexing is possible while so supported, so that the individual pieces are not permitted to contact each other and thereby possibly produce "kiss-marks." The several solutions may thereby freely contact and circulate around all surfaces of all the pieces, and a large number of the sole pieces may be clamped or otherwise held together as a unit, and moved from one treatment to the next as a unit. It will be understood that the invention is not to the specific methods shown and described herein. For example sole pieces may even not be separated, although for uniformity of treatment means for separation may be preferable.

An important feature of my invention resides in handling and treating a plurality of sole pieces as a unit and in holding such pieces flat and to full size during the entire treatment. As one means for carrying out this step I have illustrated a sole supporting tray 10 provided with longitudinally extending rods 12 and transversely extending rods 14 dividing the tray into a plurality of sole receiving compartments. The compartments are adapted to hold independently of each other a plurality of sole pieces 15 to be treated and the tray provides a means for handling all of such pieces as a unit. The rods 12 are placed in pairs one above the other and each pair is spaced from the next pair by the thickness of the leather to be treated, from $\tfrac{3}{16}$" to ⅜" clear. The length of the compartments should be the length of the sole pieces to be treated, from 12" to 14", and the depth of the compartment should be about 6", that is, something greater than the width of the sole pieces to be treated. The position of the rods 12 should be such that the pair of rods on each side of the sole piece contacts the flat surfaces of the sole piece substantially along its entire length. Each compartment substantially forms a slot into which the sole piece loosely fits and whereby the movement and particularly any flexing of the sole piece is definitely limited.

The rods 14 provide a false bottom for the trays and support the sole pieces. This false bottom might well be a wire cloth of coarse mesh or wooden slats or a perforated plate. The supporting elements 12 and 14 may be of any cross sectional shape and should be rigid enough to keep the sole pieces separated and limit their movement. These rods may be constructed of wood or any suitable metal such as stainless steel, Monel metal, brass, bronze, copper, etc. Iron is not recommended because of corrosive action which might subsequently stain the leather.

As above stated, the sole pieces are handled and treated solely within the trays 10 and any suitable tank for receiving these units and agitating the solution about and into contact with the sole pieces may be employed. In the accompanying drawing I have illustrated a tank 16 for serving this purpose. The trays with the sole pieces held therein are suitably stacked within the tank and in the solution therein. Agitation may be provided by bubbling air up from the bottom of the tank or by any suitable agitating means. I have illustrated an air pipe 18 within the tank having perforations 20 near the bottom of the tank whereby to set up the bubbling action. Steam heat may be also provided by means of a pipe 22 having a steam trap 23 at its exit end. The trays are adapted to rest on bars 24 at the bottom of the tank and may be conveniently placed in and removed from the tank in stacked relation by means of U-shaped holding members 26 clamping the trays into a unit and lowered into and from the tank by an electric hoist.

The sole pieces are now ready for finishing into soles having desirable characteristics to serve the purposes for which they are to be used. The first step in my proposed treatment is to remove the excess vegetable tannage from the pieces. For this purpose I employ an alkaline solution which may comprise borax or sal soda of a strength of ¼%–½% solution by weight. The solution should be warm, about 110° F., and should be in contact with the sole pieces for a period approximating ten to thirty minutes. Following this treatment the sole pieces may be rinsed in warm water until clean.

The sole pieces are then treated in a ¼% to ½% solution by weight, of oxalic acid, to neutralize any alkalinity and to restore a desirable color to the soles. This treatment may be done at 110° F. for 15 minutes to 30 minutes. No rinse is needed.

Following the above treatment, the sole pieces are next given a further tanning or finishing treatment to impart desirable characteristics thereto. The character of this treatment, and more particularly the strength of solution used depends to a considerable extent upon the composition and texture desired in the finished product and upon the nature of the leather from which the pieces are cut. A preferred treatment utilized a solution of basic chromium sulphate, such as "tanolin," an excess amount of solution varying from 1 lb. to 3 lbs. per gallon being used. The treatment may be carried out at room temperature. However, to save time I prefer to start the treatment at 110° F. and some air agitation may hasten the tannage. As the tannage progresses the temperature of the liquor may be increased if desired for the purpose of decreasing the time required. Following this step, the solution may be drawn off and restrengthened for further use. The soles may be rinsed to remove the excess chrome, this operation being carried on within the tank and with the soles held within the trays.

The soles are then treated in a second chrome solution at a pH substantially higher than the first chrome solution, and at a much greater dilution. This treatment "sets" the chrome tannage, and also neutralizes the soles, reducing the acidity to a minimum amount, appreciably less than ordinary vegetable-tanned soles or insoles, or chrome retanned soles or insoles.

The pH of the first fairly stronge chrome solution is lower than that of a dilute solution. The chrome tannage of the leather fibers may be "set" either by contacting with a mild alkali such as sodium bicarbonate, or with precipitated chrome (in a solution also containing chrome in solution) or even by rinsing in water, which diultes the tan thereby raising the pH and "setting" the tan. This is important because it minimizes the shrinkage of the soles during drying—shrinkage being practically eliminated.

Vegetable tanned leather and sole pieces cut therefrom tend to lie flat and in a plane because of mechanical work done on the hide before tanning such as fleshing, etc., and on the leather subsequent to the tanning, such as setting out, rolling and jacking. It is advisable to preserve during treatment as far as possible the effect of this work on the soles.

If it is desired to add or restore color to the sole pieces, a treatment with a solution of Syntans or vegetable tanning extracts, or a combination of both, may now be carried on within the tank, the amount of the solution required varying from 2% to 10% of the dry weight of the soles treated. The temperature of the solution should be about 120° F. and the time of treatment may be from fifteen minutes to two hours or longer, depending upon the amount of agitation and the concentration of the solution. This solution may also be reused by strengthening it for further batches.

Following a rinsing with water, the sole pieces may be given a fat liquoring treatment for the purpose of increasing the strength of the fibre and providing the degree of flexibility desired. The solution used in this treatment may be sulphonated oil or a mixture thereof with another suitable oil, the concentration being 1% to 10% of the dry weight of the soles being treated, or one gallon sulphonated oil per ten to twenty gallons of solution. The treatment and the solution used will of course vary with the result it is desired to produce and with the character of the leather from which the sole pieces are cut.

The trays are now removed from the tank and allowed to drain. Following this, the sole pieces while still remaining in the trays are allowed to dry, slowly at first, but finally higher temperatures may be permitted to assure that drying is fully completed. After the treatments are completed and the product thoroughly dried the soles are removed from the trays. If the sole pieces are treated flat between perforated plates they will be entirely flat. However the soles treated on edge in trays are substantially as flat on completion of the treatment as they were to start with. Following this, they may be buffed on either or both flesh and grain faces and treated in a flexing machine if greater flexibility is desired. They are then ready to be reselected for thickness and quality after which they may be assembled in case lots ready for shipment or use.

In the treatment of the more lightly vegetable tanned stock I have found it desirable to hold the sole pieces more firmly to eliminate the possibility of warping, curling, or shrinkage. In such case I may employ a sole supporting unit 30 comprising two foraminous sole supporting sheets or plates 31 and 32 of brass, copper, or stainless steel, each sheet being supported in a frame 33 and reinforced by bars 34 to prevent sagging of the sheet. The sheets 31 and 32 may be substantially alike except that the sheet 32 may be provided with a plurality of sharp pins or projections 35 extending outwardly from one face thereof. These projections may be integral with the sheet, as illustrated, or formed in any suitable manner.

Each unit 30 is adapted to hold a plurality of sole pieces 36 to be treated. The cut sole pieces are laid out flat on the sheet 31 with the flesh side facing upwardly. When the sheet 31 is thus filled with soles, the sheet 32 is placed thereon and the two frames 31 and 32 are clamped together at 38 with a pressure causing the pins 35 to penetrate into the flesh side of the sole pieces and the two plates to hold the soles in flat condition therebetween. In this position the sole pieces are supported not only against warping from flat shape by the engagement of the pins therewith but serves furthermore to prevent shrinkage of the pieces from their original size during the treating and drying operations. The soles remain in this grouped and flatly supported condition and are handled as a unit in such condition during the entire treatment thereof.

The filled frames 30 are thereafter placed in stacked relation, vertically or horizontally, in a suitable treating tank and treated in the manner above described relative to the trays 10. The treating tank can be of any suitable construction and the treating solution therein can be agitated in any convenient manner or the tank may embody a rotatably mounted container wherein rotation of the container agitates the treating solution.

It will now be apparent that I have provided a method of chrome tanning vegetable tanned soles wherein great economy is effected in both materials and labor costs and a superior product is produced. The sole pieces are cut out from rough-tanned or completely vegetable-tanned leather and only selected portions of the leather are given these treatments, thus eliminating costs in materials and labor, reducing the time required in the treatments and requiring less invested capital. The mounting and treating of the sole pieces in grouped arrangement saves further cost in labor and serves to keep the soles in flat condition and to substantially their original size during the entire treatment, thus producing a better and more uniform product and a product wherein the different lots treated are more uniform. The keeping of the soles in the trays or frames until thoroughly treated and dried eliminates curling and minimizes shrinking and produces a flat and desirable product. It is furthermore apparent that, when soles are cut and graded for quality or character, then further graded for thickness, and finally treated in this classified grouping wherein soles all of the same character and thickness only are subjected to treatment, the results must be superior for uniformity, accuracy and economy than when an area containing many qualities and thickness variations is treated.

While I have herein generally described my invention as consisting in cutting sole pieces from rough-tanned leather and thereafter treating the pieces to completely tan and give the desired characteristics thereto, I desire it to be understood that the expression "rough-tanned" is herein used in its broad sense to include the vegetable tanning of the leather to any condition or degree wherein further treatment of the sole pieces cut therefrom is necessary or desirable and the term "sole pieces" as herein used includes not only pieces corresponding in size and shape to the completed soles but also sole forming pieces from which soles can be subsequently completed by further trimming or cutting thereof and which pieces will ordinarily have one dimension approximating the length of the sole being formed. More specifically, my invention consists in cutting sole pieces from finished vegetable-tanned sole leather taken from sides, backs, shoulders and bellies, and thereafter chrome re-tanning such pieces to produce soles having desirable characteristics. The process permits the preliminary selecting of sole pieces for uniformity of thickness and other characteristics, and the subsequent treatment thereof to produce a superior product. In grouping sole pieces in frames or trays such as illustrated in the drawing, the pieces will preferably be nested close together.

Having thus disclosed my invention what I claim as new and desire to secure by Letters Patent of the United States is, 1. A method of preparing soles which consists in selecting and cutting sole pieces of the desired size and configuration from vegetable-tanned leather, placing and holding a plurality of said pieces as a unit in flat position with both faces of the pieces exposed, and treating said pieces as a unit with a series of solutions including at least one chrome tan solution while holding them in said position.

2. A method of preparing soles which consists in selecting and cutting from vegetable-tanned leather sole pieces approximating in one direction the length of the sole to be formed, placing and holding a plurality of said pieces as a unit in flat position with both faces of the pieces exposed, and treating a plurality of said units simultaneously in a chrome tanning solution while holding the pieces in said flat position.

3. A method of preparing soles which consists in cutting sole pieces of the desired size and configuration from vegetable-tanned leather, mounting and supporting a plurality of said pieces in predetermined and flat position between foraminous supports exposing the pieces and adapted to handle them as a unit, and treating said pieces uniformly in a series of solutions at least one of which is a chrome tan while thus supported whereby to give the pieces desirable sole characteristics.

4. A method of preparing soles which consists in cutting sole pieces of the desired size and configuration from vegetable-tanned leather, mounting and supporting a plurality of said pieces in predetermined and flat position between foraminous supports holding the pieces against shrinkage and adapted to handle them as a unit, and treating said pieces uniformly in a solution while thus supported whereby to produce flat soles of original size and having desirable sole characteristics.

5. A method of chrome re-tanning which consists in cutting sole pieces of the desired size and configuration from vegetable-tanned leather, mounting and supporting a plurality of said pieces in predetermined flat position between supports adapted to handle said pieces as a unit, placing a plurality of said units in a chrome bath, and treating the pieces uniformly in said bath while thus supported whereby to accomplish said chrome re-tanning thereof.

6. A method of preparing soles which consists in cutting sole pieces of the desired size and configuration from vegetable-tanned leather, mounting and supporting a plurality of said pieces in predetermined flat position and in a common plane between supports penetrating said pieces to a depth holding the pieces against shrinkage and adapted to handle said pieces as a unit, placing a plurality of said units in a bath, and treating the pieces uniformly in said bath while thus supported whereby to produce flat soles of original size and having desirable sole characteristics.

7. A method of preparing soles which consists in cutting sole pieces of the desired size and configuration from vegetable-tanned sole leather, grouping and holding a plurality of said pieces in flat condition and against shrinkage, and giving said pieces further finishing treatment in a chrome retanning solution while holding them in said condition whereby to produce flat soles of original size and having desirable sole characteristics.

8. A method of preparing soles which consists in cutting sole pieces of the desired size and configuration from vegetable-tanned leather, and thereafter treating said pieces to chrome-retan and bring the same to the desired texture and flexibility by holding a plurality of said pieces in predetermined flat position and treating them as a unit whereby said pieces are treated uniformly and kept to uniform shape during the treatment.

9. The method defined in claim 8 in which a plurality of said sole pieces are held in predetermined flat position and against shrinkage and are treated as a unit while thus supported whereby such pieces are treated uniformly and kept to uniform shape and original size during the treatment.

10. A method of preparing soles which consists in cutting sole pieces of the desired size and configuration from vegetable-tanned leather, supporting a plurality of said pieces in relatively spaced and predetermined position wherein they can be handled as a unit, treating said unit in an alkaline solution removing vegetable tannage from the pieces further tanning the pieces by subjecting the unit to a chromium sulphate solution, and thereafter strengthening the fibre of the pieces and rendering them flexible by treating the unit with an oil solution, the sole pieces being held in flat condition with both faces exposed during all of said treatments.

11. A method of preparing soles which consists in cutting sole pieces of the desired size and configuration from vegetable-tanned leather, supporting a plurality of said pieces in relatively spaced and predetermined position wherein they can be handled as a unit, treating said unit in an alkaline solution removing vegetable tannage from the pieces, treating the unit with a dilute acid solution, further tanning the pieces by subjecting the unit to a chromium sulphate solution, and thereafter strengthening the fibre of the pieces and rendering them flexible by treating the unit with an oil solution, the sole pieces being held in flat condition with both faces exposed during all of said treatments.

12. The method defined in claim 11 in which the dilute acid used is oxalic acid and in which said chromium sulphate solution tanning is conducted in the presence of oxalates resulting from the prior oxalic acid treatment.

13. A method of preparing soles which consists in cutting from vegetable-tanned leather sole pieces approximating in one dimension the length of the sole to be formed, supporting a plurality of said pieces in relatively spaced and predetermined position wherein they can be handled as a unit, treating said unit in a series of solutions, including a solution of chrome tan, and followed by treating in a second solution by means of which the pH of the chrome solution within the sole pieces is slightly raised so as to precipitate and "set" the chrome tan and thereby chrome tan the stock so that the tendency to shrink during drying and subsequent operations is substantially eliminated, the sole pieces being held in flat condition and without flexing and with both faces exposed during all of said treatments.

14. A method of preparing soles which consists in cutting from vegetable-tanned leather sole pieces approximating in one dimension the length of the sole to be formed, supporting a plurality of said pieces in relatively spaced and predetermined position wherein they can be handled as a unit, treating said unit in a series of solutions, including a solution of chrome tan, wherein the sole pieces acquire a chrome tannage, and holding the sole pieces in flat condition without flexing and with both faces exposed during all of said treatments.

15. A method of preparing soles which consists in cutting pieces of the desired size and configuration from fully vegetable tanned sole leather, well filled with vegetable tannin materials so as to be of a firm and dense nature, and thereafter removing part of the excess vegetable tannin materials from the flesh and grain surfaces by a soaking operation without flexing or otherwise intermittently compressing the leather so that the concentration of the vegetable tannins in the center strata remains substantially unchanged, and thereafter chrome tanning said selected pieces whereby to finish tan and increase the flexibility and compression resilience of said grain and flesh surfaces, while substantially maintaining the original density and firmness of the center strata, and to increase the wear durability of the soles.

EDWARD DEMING VAN TASSEL, Jr.